(No Model.) 2 Sheets—Sheet 1.
C. MARGUTTI & G. MIANI.
BRAKE APPARATUS FOR RAILWAY OR STREET CARS.
No. 539,695. Patented May 21, 1895.
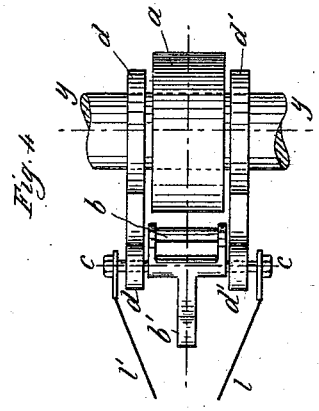
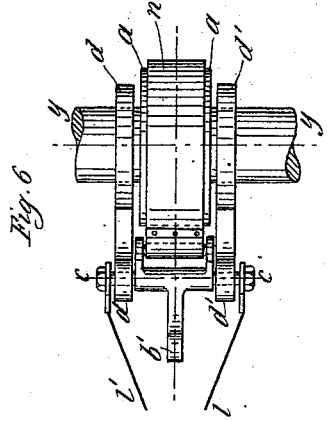
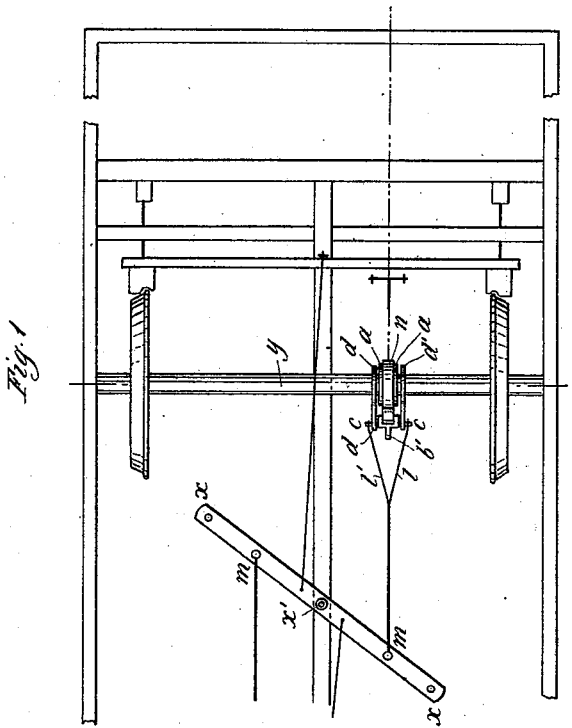
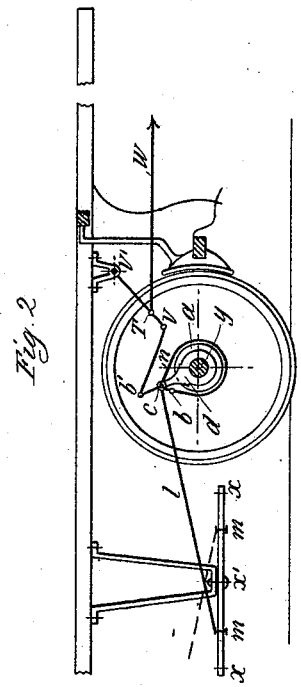
Witnesses:
G. W. Rea
Thos. A. Green
Inventors:
Carlo Margutti and
Guglielmo Miani,
By James L. Norris
Atty.

(No Model.) 2 Sheets—Sheet 2.
C. MARGUTTI & G. MIANI.
BRAKE APPARATUS FOR RAILWAY OR STREET CARS.
No. 539,695. Patented May 21, 1895.
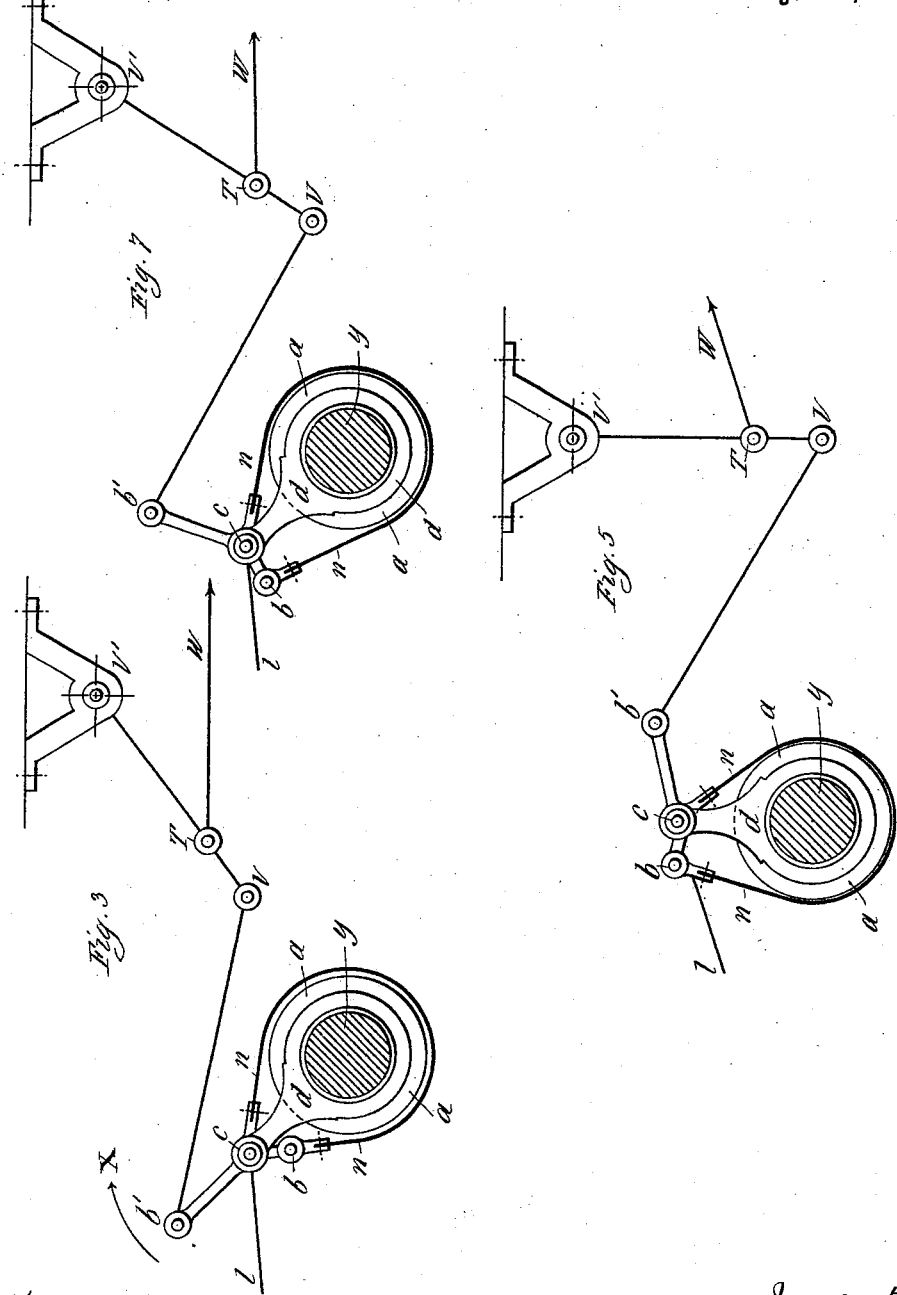

UNITED STATES PATENT OFFICE.

CARLO MARGUTTI AND GUGLIELMO MIANI, OF MILAN, ITALY.

BRAKE APPARATUS FOR RAILWAY OR STREET CARS.

SPECIFICATION forming part of Letters Patent No. 539,695, dated May 21, 1895.

Application filed May 10, 1894. Serial No. 510,778. (No model.) Patented in Italy March 16, 1894, LXX, 186.

*To all whom it may concern:*

Be it known that we, CARLO MARGUTTI and GUGLIELMO MIANI, civil engineers, subjects of the King of Italy, and residents of Milan, in the Kingdom of Italy, have jointly invented certain new and useful Improvements in and Relating to Brake Apparatus for Railway or Tramway Vehicles, (for which we have obtained a patent in Italy, Vol. 70, No. 186, bearing date March 16, 1894,) of which the following is a specification, reference being had to the accompanying drawings.

Our invention relates to brake apparatus for railway and tramway vehicles.

In the brake apparatus constructed according to our said invention the device by which the brake blocks are applied to the wheels consists of a band brake similar to those employed in lifting apparatus, but the mode of operation is altogether different. In the trials made up to the present time with the object of applying these devices to the braking of the vehicles, the lever to which the ends of the band are attached has its center of rotation at a fixed point of the frame of the vehicle. The effect, as in lifting apparatus, is to slacken or stop the rotation of the axle to which the brake is applied. These trials have not been successful, for the instantaneous stoppage of the axle causes the wheels to become loose in time. In our improved apparatus the band brake exerts no direct action upon the axle on which it is mounted. The braking takes place by pressing the blocks of ordinary brakes against the tires of the wheels. The band brake intervenes only to establish instantaneously a connection between the axle whereon it is mounted and the parts arranged in any desired manner which actuate the blocks of known brakes. In this arrangement, while avoiding the inconvenience of the before-mentioned loosening of the wheels, we utilize the energy stored up in the axle and wheels for forcing the blocks against the latter. Under these circumstances the force whereby the band brake is set in action, which may be effected by hand with the aid of a direct-acting pedal through the intervention of any suitable mechanism, an electric engaging device or the like, has only to overcome a very small resistance.

In the accompanying drawings we have represented by way of example how our improved apparatus may be applied to a vehicle.

Figures 1 and 2 are a plan and elevation showing the general arrangement. Only one-half of the vehicle is shown by reason of the similarity between the front and rear half. Figs. 3 and 6 represent an elevation and plan of the band-brake apart in the position which it occupies when it is not applied. Fig. 4 is a plan showing the band $n$ of the brake to have been removed. Fig. 5 represents the improved apparatus in the position for applying the brake. Fig. 7 shows an intermediate position between that of Fig. 3 and that of Fig. 5.

In carrying this invention into practice we place a flexible band $n$ round the drum $a\ a$ keyed upon the axle $y\ y$ of the vehicle. One end of the band $n$ is attached to one of the extremities $b$ of a bell-crank lever $b\ c\ b'$, while the other end terminates at $c$ which is the center of rotation or pivot of the said lever. This pivot is susceptible of being displaced through an arc of a circle concentric with the axle, being mounted upon two collars $d\ d'$ which are loose on the axle $y\ y$ or on the said drum $a\ a$. To the same pivot $c$ we attach one extremity of a rod $l\ l'$ the other extremity $m$ of which actuates a lever $x\ x'$ for operating the blocks of the brakes. By exerting a small pressure upon the arm $c\ b'$ of the bell-crank lever in the direction of the arrow X by any suitable means, such as for example by the levers W T, V T V', V $b'$ we cause the said pivot $c$ to turn about the axle (the brake passing from the position indicated in Figs. 3 and 6 first to that indicated in Fig. 7 and then to the position shown in Fig. 5), and to carry away the rod $l\ l'\ m$ and lever $x\ x$. By this means the band brake is first applied (Fig. 7), whereupon the blocks are forced almost instantaneously against the tires, the band brake being carried away to the position indicated in Fig. 5, the energy which is stored up in the axle and wheels being utilized for this purpose. When the force transmitted to the bell-crank lever in the direction of the arrow X is removed the rod $l\ l'\ m$ will be actuated in its turn by the blocks which recede from the tires and bring the band brake back to the position indicated in Figs. 3 and 6 in which it may be actuated as before. As the force producing the brake action is derived from the axle in motion and transmitted through the flexible band of the brake the momentum of the vehicle to be slackened may attain such great values as to render it necessary, in some cases, to employ several bands mounted one by the side of the other, or one or more articulated chains operating in the same manner, or a band strengthened by wires or other equivalent devices.

What we claim is—

The combination with brake-shoes adapted to act against the wheels of a car-axle, of a drum $a$ rigid on the axle, loosely mounted collars $d$, $d'$, a bell-crank-lever $b$, $b'$ having a pivot $c$ mounted on the collars, a brake-band $n$ passing around the drum and having its two extremities connected respectively with the pivot $c$ and the lever-arm $b$ of the bell-crank-lever, a pivoted lever $x$ connected with the brake-shoes, a rod connection $l$, $l'$ between the pivot of the bell-crank-lever and the brake-shoe operating-lever, and devices connected with the lever-arm $b'$ for rotating the said collars, substantially as described.

In testimony whereof we have hereunto set our hands this 6th day of April, 1894.

CARLO MARGUTTI.
GUGLIELMO MIANI.

Witnesses:
CARLO BARFAÑO,
GUIDO LUALEH.